United States Patent [19]

Davis et al.

[11] 3,864,735

[45] Feb. 4, 1975

[54] READ/WRITE SYSTEM FOR HIGH DENSITY MAGNETIC RECORDING

[75] Inventors: Martin F. Davis, Thousand Oaks; Francis J. Schwanauer, Agoura; Ivan E. Walenta, Westlake Village; Gary J. Walker, Thousand Oaks, all of Calif.

[73] Assignee: Burroughs Corporation, Detroit, Mich.

[22] Filed: Sept. 12, 1973

[21] Appl. No.: 396,479

[52] U.S. Cl. .................................... 360/51, 360/43
[51] Int. Cl. ............................................ G11b 5/09
[58] Field of Search .............. 360/43, 39, 40, 51, 27

[56] References Cited

UNITED STATES PATENTS

| | | | |
|---|---|---|---|
| 3,020,526 | 2/1962 | Ridler et al. | 360/44 |
| 3,065,461 | 11/1962 | Aronis | 360/51 |
| 3,172,091 | 3/1965 | Friend | 360/51 |
| 3,699,554 | 10/1972 | Jones | 360/43 |

*Primary Examiner*—Vincent P. Canney
*Attorney, Agent, or Firm*—Albin H. Gess; Nathan Cass; Edward G. Fiorito

[57] ABSTRACT

A method and apparatus for encoding and decoding binary data for writing and reading on a moving storage medium, the data being encoded according to a self-clocking code such as the modified frequency modulated (MFM) encoding scheme, provides high density data storage with high speed data retrieval. Non-return to zero (NRZ) encoded data is encoded into MFM data for storage, with the use of a write clock signal that is responsive to the speed variations of the storage medium. The write clock signal, sector mark signals and a storage medium speed indicating signal are synthesized from an index signal generated in response to the speed of the storage medium. The storage medium speed indicating signal is utilized by a multi-mode read clock recovery circuit to generate a read clock in response to the reading of the MFM encoded data. This read clock is utilized to generate asymmetrical data windows for decoding the MFM encoded data read from the storage medium into NRZ encoded data.

5 Claims, 3 Drawing Figures

READ/WRITE SYSTEM FOR HIGH DENSITY MAGNETIC RECORDING

BACKGROUND OF THE INVENTION

The present invention relates generally to improvements in methods and apparatus for reading and writing binary encoded data on moving storage mediums and more particularly pertains to new and improved encoding and decoding methods and apparatus for use in systems utilizing moving storage mediums.

Prior art moving storage systems for binary data such as magnetic tape, magnetic disk file, and magnetic disk pack systems have been concerned with increasing the density of information storage and decreasing input and output time without derogating the validity of the retrieved data. Those moving storage systems that have increased the density of information stored and decreased the input and output time have exhibited considerable increase of errors in the retrieved binary data. The present invention does not exhibit this shortcoming.

SUMMARY OF THE INVENTION

An object of this invention is to provide an improved method and apparatus for storing binary data on and retrieving binary data from a moving storage medium.

A further object is to provide a method and apparatus for reading and writing binary encoded data on a moving storage medium that provides high density storage and accurate data retrieval.

These objects and the general purpose of this invention are obtained by encoding non-self-clocking binary data into selfclocking binary data with the use of a write clock signal that is responsive to the speed variations of the storage medium, and decoding the self-clocking binary data into non-self-clocking binary data by utilizing the read clock signal recovered from the read self-clocking binary data to generate asymmetrical decoding windows. The write clock, along with sector mark signals utilized for addressing data on the storage medium, and an analog speed indicating signal are synthesized from an index signal that is responsive to the speed variations of the storage medium. During data retrieval, the analog speed indicating signal is utilized in generating the read clock signal in response to receiving the self-clocking binary encoded data.

BRIEF DESCRIPTION OF THE DRAWINGS

Other objects and many of the attendant advantages of this invention will be readily appreciated as the same becomes better understood by reference to the following detailed description when considered in conjunction with the accompanying drawings in which like reference numerals designate like parts throughout the figures thereof and wherein.

DESCRIPTION OF THE PREFERRED EMBODIMENTS

Figure 1:
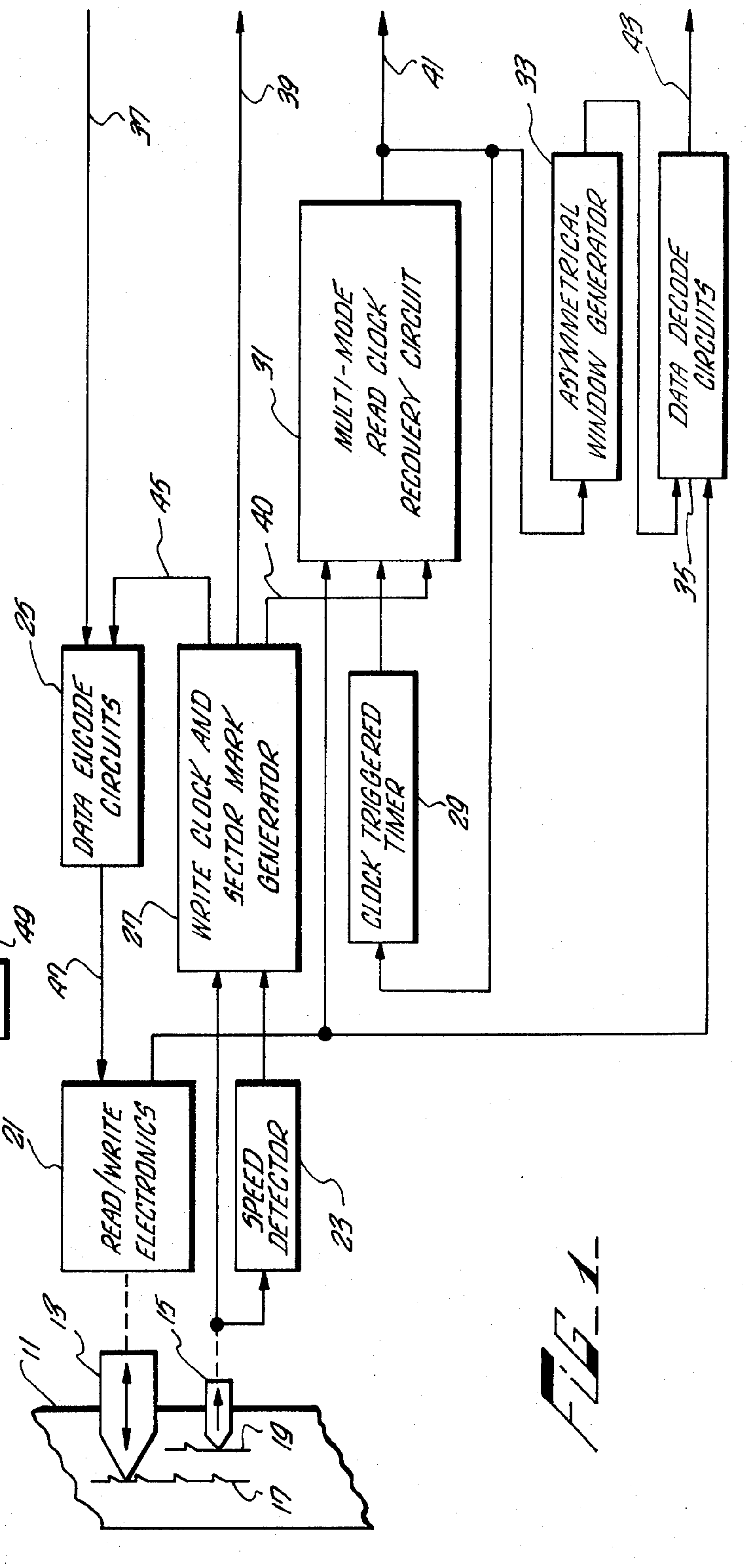
FIG. 1 is a block diagram illustration of a binary storage system built according to the invention.

Referring first to FIG. 1, a moving storage medium 11, which could be a magnetic disk carrying at least one channel 17 of binary data and a channel 19 of index pulses, has data written and read on the storage medium 11 by a transducer 13. A transducer 15 reads the index information from track 19. For the sake of convenience and ease of understanding, the description will procede with the assumption that storage medium 11 is a magnetic storage medium. The transducer 13, therefore, will be an electromagnetic transducer that supplies impulses to and receives impulses from read/-write electronics 21. The read/write electronics 21 consists of pulse shapers and current drivers that are well-known in the art, and do not constitute a part of this invention.

Data encode circuits 25 receive non-return to zero (NRZ) ecode data on line 37 from an NRZ source (not shown) and a write clock on line 45 from a write clock and sector mark generator 27. The data encode circuits encode the NRZ binary data into modified frequency modulated (MFM) data, which is self-clocking, in a manner that will be subsequently explained. This MFM data is supplied over line 47 to the read/write electronics 21. The read/write electronics, in a manner well-known in the art, drives the electromagnetic transducer 13 to cause flux transitions on the magnetic medium 11, as dictated by the received MFM encoded data. The write clock and sector mark generator 27 generates write clock signals on line 45, sector mark signals on line 39, and an analog speed indicating signal, on line 40 in response to the reception of an index signal from transducer 15 and an ouput from a speed detector 23.

The speed detector 23 responds to the index pulses supplied to it by the electromagnetic transducer 15 to generate a signal whenever a certain percentage of the terminal speed of the magnetic storage medium 11 is reached. The structure used for the speed detector to accomplish this function is well within the purview of a person of ordinary skill in the art and does not constitute a part of this invention. As an example of structure that can be used, the index pulses received from electromagnetic transducer 15 can be supplied to the input of a multivibrator circuit having a certain RC time constant, which time constant has been adjusted to equal the interval of occurrance between arriving index pulses when the storage medium 11 is travelling at the desired terminal speed or the desired percentage of terminal speed. The arriving index pulses would trigger the multivibrator, which in turn, could time-out prior to the arrival of the next index pulse, thereby indicating that the storage medium is still travelling below the desired speed. If, however, the next index pulse arrives before the timing out of the multivibrator, the predetermined velocity, set into the multivibrator by the R-C circuit, is exceeded. Besides feeding the index pulse to the multivibrator circuit, it would be supplied to the set input of a latch circuit, the output of the multivibrator being supplied to the reset input of the latch circuit. Therefore, obviously, as long as the index pulses are arriving after the multivibrator times out, the latch circuit would remain in the reset state until the index pulses arrive before the timing out of the multivibrator, thereby setting the latch, causing a signal to be sent to the write clock and sector mark generator 27. This particular example of one form of the speed detector should not be considered as the only form it can take. For example, the speed detector need not utilize the index pulses generated by the electromagnetic transducer 15. It could take the form of a digital tachometer, which generates digital signals, the frequency of which indicates the speed of the magnetic medium. These digital signals could be compared with the output of a clock, which has its frequency set to represent the desired speed of the electromagnetic medium 11, a comparison, of course, resulting in a signal being supplied to the write clock and sector mark generator 27.

The structure and operation of the write clock and sector mark generator 27 is described in a copending application entitled "Clock and Sector Mark Generator for Rotating Storage Units" by Francis Schwanauer, having U.S. Ser. No. 383,162 filed July 27, 1973, now U.S. Pat. No. 3,828,271, issued Aug. 6, 1974, and assigned to the same assignee as this invention. The specification of that application is completely incorporated herein by reference.

During read-out of the data recorded on the magnetic medium 11, the read/write electronics 21 supplies the MFM encoded binary data to a multi-mode read clock recovery circuit 31, which in addition receives a time-out signal from a clock triggered timer 29 and an analog speed signal, on line 40, from the write clock and sector mark generator 27. In response to these signals, the multi-mode read clock recovery circuit 31 generates read clock signals on line 41.

The clock triggered timer 29 functions to supply a signal to the multi-mode read clock recovery circuit 31 after a predetermined period of time subsequent to the reception by it of the first read clock pulse. The structure that may be utilized to accomplish this function does not constitute a part of this invention and is considered to be well within the purivew of a person of ordinary skill in the art. For example, circuitry utilizing a crystal oscillator could be devised to trigger upon the reception of a first read clock pulse from the multimode read clock recovery circuit 31 and after a pre-set, predetermined, period of time causing an output signal to be transmitted to the multi-mode read clock recovery circuit 31. Thereafter, the timer 29 would be nonresponsive to read clock pulses received until it is reset by a start command generated at the initiation of another read or write cycle.

The multi-mode read clock recovery circuit 31 is structurally and functionally described in a copending patent application entiled "Multi-Mode Recovery Circuit for Self-Clocking Encoded Data" by Martin F. Davis et al having U.S. Ser. No. 383,334 file July 27, 1973, now U.S. Pat. No. 3,831,195, issued Aug. 20, 1974, and assigned to the assignee of this application. The specification of the application is completely incorporated herein by reference.

The read clock signals generated by the multi-mode recovery circuit 31 on line 41 are supplied to an asymmetrical window generator 33 which generates the decode windows that are used by the data decode circuits 35 to decode the MFM encoded data received by them from read/write electronics 21 into NRZ encoded data on line 43. The asymmetrical window generator 33 and the data decode circuits 35, are structurally and functionally explained in a copending application for "Method and Apparatus for Coded Binary Data Retrieval" by Ivan E. Walenta, having U.S. Ser. No. 302,915, filed Nov. 1, 1972, now U.S. Pat. No. 3,794,987, issued Feb. 26, 1974, and assigned to the assignee of this application. The specification of that application is completely incorporated herein by reference.

The sector mark signals on line 39, the read clock signals on line 41, and the NRZ encoded data on line 43 are supplied to utilization circuits (not shown) that are well-known in the art and will not be herein explained since they do not constitute a part of this invention. The NRZ encoded data on line 37 is received from an NRZ data source that is well-known in prior art and will not be herein explained since it does not constitute a part of this invention.

Figure 2:
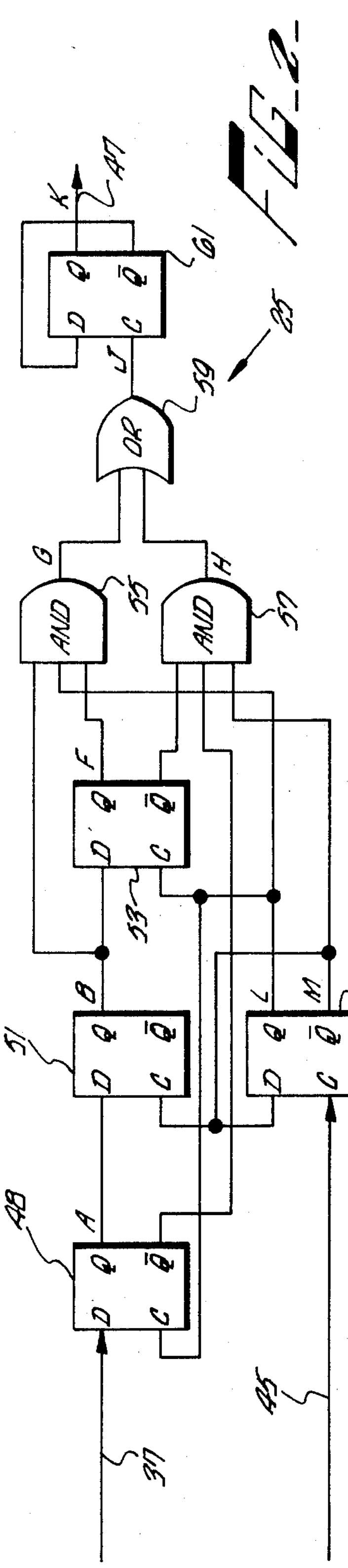
FIG. 2 is a logic diagram of the preferred embodiment of the data encode circuits used by this invention.

Referring now to FIG. 2, which illustrates the preferred embodiment of the data encode circuits 25, D flip-flop 48 receives the NRZ encoded data at its D input from line 37 and D flip-flop 49 receives the clock signals from line 45 at its C input. The outputs of D flip-flop 49 are supplied to the clocking inputs of the three D flip-flops 48, 51, and 53, respectively, in addition to the AND gates 55 and 57. The two outputs of the AND gates are supplied to an OR gate 59 which has its output supplied to a D flip-flop 61 at its C input. D flip-flop 61 is connected to function as a toggle. The output of the D flip-flop is the MFM equivalent of the NRZ data received by D flip-flop 48 on line 37.

Figure 3:
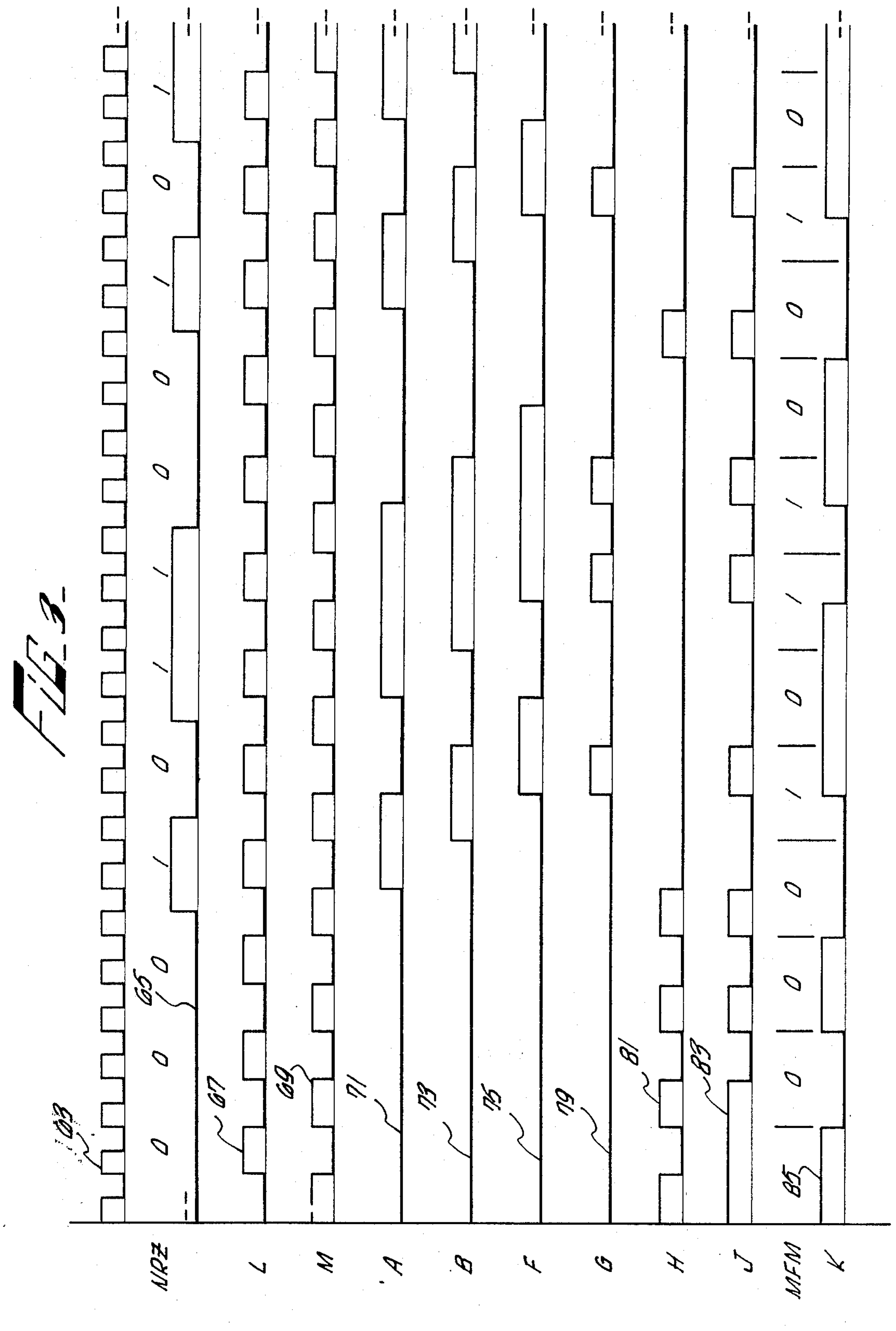
FIG. 3 is a pulse diagram illustration of the functional interrelationship of the logic elements in the data encode circuit of FIG. 2.

FIG. 3 illustrates the signals flowing into and out of the various logic elements of the decode circuit of FIG. 2. Signals 63 are the clock signals presented to the C input of D flip-flop 49 on line 45. Signals 65 are the NRZ encoded data supplied to the D imput of flip-flop 48 on line 37. Signals 67 are the Q output of D flip-flop 49. Signals 69 are the Q output of the flip-flop 49. Signals 71 are the Q output of D flip-flop 48, generated in response to the NRZ signals 65 and the clock signals 67. Signals 73 are the Q output of D flip-flop 51 in response to signals 71 and 69. Signals 75 are the Q output of D flip-flop 53 in response to signals 73 and signals 67. Signals 79 are the output of AND gate 55 in response to signals 73, signals 67, and signals 75. Signals 81 are the output of AND gate 57 in response to the presence signals 69 and the inverse of signals 75, and signals 71. Signals 83 are generated by OR gate 59 in response to signals 79 and 81. Signals 85 are generated by D flip-flop 61 in response to the signals 83 being supplied to its clock input. As can be seen from FIG. 3, the output signals 85 of D flip-flop 61, on line 47, are the MFM encoded equivalent of the NRZ encoded data presented to D flip-flop 48 on line 37.

From the above description, it is obvious that an improved method and apparatus for storing binary data and retrieving binary data has been presented. This improved method provides very high density storage and accurate data retrieval. It should be understood, of course, that the foregoing disclosure relates only to the preferred embodiment of the invention and that numerous modifications may be made therein without departing from the spirit and scope of the invention as set forth in the appended claims.

I claim:

1. In a system for reading and writing self-clocking binary encoded data on a moving storage medium having data writing and reading apparatus and apparatus for generating a signal indicating the speed of said storage medium, binary data encoding and decoding apparatus, comprising:

means responsive to the speed indicating signal for generating write clock signals;

means utilizing the write clock signals for encoding input binary data, encoded according to a non-self-clocking encoding scheme, into a self-clocking binary data pattern for writing on the storage medium;

means responsive to the storage medium speed indicating signal and the self-clocking binary data pattern read from the storage medium for generating read clock signals;

means responsive to the read clock signals for generating asymmetrical data windows; and, means utilizing the asymmetrical data windows for decoding the self-clocking binary data pattern read from the medium into a binary data pattern representative of the non-self-clocking input binary data.

2. The binary data encoding and decoding apparatus of claim 1 wherein said means for generating write clock signals synthesize the write clock signals from a digital storage medium speed indicating signal and generates an analog storage medium speed indicating signal.

3. The binary data encoding and decoding apparatus of claim 1 wherein said means for encoding is adapted to encode NRZ encoded binary data into MFM encoded binary data.

4. The apparatus of claim 3 wherein said encoding means, comprises:

a plurality of D-type flip-flops for receiving the NRZ encoded binary data and the write clock signal, a combinatorial logic circuit responsive to said plurality of D-type flip-flops for generating control pulses; and a D-type flip-flop connected as a toggle, responsive to the control pulses from said combinatorial logic circuit for generating the MFM encoded equivalent of the received NRZ encoded binary data.

5. In a system for reading and writing self-clocking binary encoded data on a moving storage medium, a method of encoding input non-self-clocking encoded data into self-clocking encoded data, for writing on the moving storage medium, and for decoding self-clocking encoded data read from the moving storage medium, said method comprising:

generating a signal indicating the speed of said storage medium;

responsive to the speed indicating signal, generating write clock signals;

responsive to the write clock signals and the input non-self-clocking encoded data, generating self-clocking encoded data;

responsive to the speed indicating signal and the self-clocking encoded data read from the storage medium, generating read clock signals;

responsive to the read clock signals, generating asymmetrical data windows; and, responsive to the asymmetrical data windows and the self-clocking encoded data read from the medium, generating a binary data pattern representative of the input non-self-clocking encoded data.

* * * * *